United States Patent [19]

Krehl et al.

[11] 4,218,612

[45] Aug. 19, 1980

[54] MAGNETIC SIGNAL DETECTOR

[75] Inventors: William H. Krehl, Homestead; John R. DeHart, Coral Gables, both of Fla.

[73] Assignee: Docutronix, Inc., Homestead, Fla.

[21] Appl. No.: 948,967

[22] Filed: Oct. 5, 1978

[51] Int. Cl.² .................... G06K 7/08; G06K 19/06; G11B 5/09

[52] U.S. Cl. .................... 235/449; 235/493; 360/53

[58] Field of Search ............ 235/449, 450, 493, 455; 360/53; 35/48 B

[56] References Cited

U.S. PATENT DOCUMENTS

| | | | |
|---|---|---|---|
| 3,290,487 | 12/1966 | Scott | 235/450 |
| 3,654,435 | 4/1972 | Vaccaro | 235/493 |
| 3,840,892 | 10/1974 | Hayashi | 360/53 |
| 3,895,220 | 7/1975 | Nelson | 235/493 |
| 4,006,455 | 2/1977 | Hamilton | 360/53 |
| 4,053,737 | 10/1977 | Lafevers | 235/449 |

*Primary Examiner*—Robert M. Kilgore
*Attorney, Agent, or Firm*—McCormick, Paulding & Huber

[57] ABSTRACT

A circuit is disclosed for monitoring the output voltage of a magnetic pickup and for producing output signals representing the valid detection of bars of magnetized ink moved past the pickup. The circuit is capable of detecting and providing correct output data from input signals ranging from relatively weak signals of low amplitude to relatively strong signals which are of high amplitude and include overshoot pulses of substantial amplitude. The circuit is disclosed in association with a system for sorting envelopes containing inserts coded with bars of magnetic ink, the output of the signal detecting circuit being used as the input to a sorter logic controlling a sorter mechanism.

10 Claims, 3 Drawing Figures

MAGNETIC SIGNAL DETECTOR

BACKGROUND OF THE INVENTION

This invention relates to a signal detecting circuit for use with a pickup for sensing magnetized bars of ink moved past the pickup, and deals more particularly with such a detecting circuit capable of correctly identifying bar generated features in the output voltage waveform of the pickup despite wide differences in the magnetic strength of the individual bars and in the strength of the corresponding signals generated in the pickup by such bars.

The magnetic signal detector of this invention may be used in any of a wide variety of applications wherein information is conveyed by a plurality of spaced parallel bars or lines of magnetic ink printed on a suitable carrier and wherein the information is retrieved or read by magnetizing the ink and then moving the carrier past a pickup which for each bar or line moved therepast has a characteristic output voltage pattern or signature consisting of a first main pulse of one polarity followed by a second main pulse of opposite polarity. By way of example, the detector is shown herein in association with an envelope sorting apparatus and an encodable envelope insert such as disclosed in U.S. Pat. No. 3,895,220, which is incorporated herein by reference and to which reference may be made for further details of the sorter apparatus and of the encodable insert.

In the case of a sorting system, such as disclosed herein, the documents processed are often found to vary widely with regard to the quantity or density of the magnetic ink used to print the bars of the code. In one document the lay down of ink may be quite light so that signals of relatively small amplitudes are produced as the bars of that document are moved past the pickup. In another document the ink may be very heavy and produce signals of very large amplitude as the bars of that document pass the pickup. Further, in this latter situation the voltage signal generated in the pickup by each bar may also include an initial secondary pulse and a terminal or overshoot secondary pulse of significant amplitudes and either of which secondary pulses might be misinterpreted by existing prior art detectors as a pulse representing another bar of magnetic ink.

The general object of this invention is, therefore, to provide a magnetic signal detector for use with a magnetized bar sensing pickup which correctly identifies bars of magnetized ink passing the pickup despite wide variations in the lay down of the ink and particularly despite the fact that the ink may be so heavy as, for each bar, to produce in the output voltage of the pickup initial or terminal secondary pulses of substantial amplitude.

SUMMARY OF THE INVENTION

The circuit of this invention is intended for use with coding systems using bars of magnetized ink or similar material and with a pickup for reading such bars which pickup produces, as each bar is moved past it, an output voltage pattern consisting of a first main voltage pulse of one polarity followed immediately by a second main voltage pulse of the opposite polarity. The invention resides in the detecting circuit comprising a means for producing an output signal indicating the valid detection of a bar of magnetic material only when the output voltage waveform of the pickup undergoes a pulse of one polarity having an amplitude greater than a first predetermined value and is immediately followed by a pulse of the opposite polarity having an amplitude greater than a second predetermined value. Thus, an initial secondary pulse is not interpreted as representing a bar of magnetic material since it is of the wrong polarity, and a terminal or overshoot secondary pulse is not interpreted as representing a bar of magnetic material since such pulse is not immediately followed by a pulse of opposite polarity.

The invention further resides in the circuit including a first comparator for comparing voltage pulses of one polarity with one set point voltage, a second voltage comparator for comparing voltage pulses of the opposite polarity with a second set point voltage, a means for delaying the output signal from the first comparator, and a means for producing an output signal indicating the detection of a bar of magnetic material when the delayed signal of the first comparator is of one value and exists simultaneously with an output signal of a given character from the second comparator.

The invention also resides in the set point voltages of the two comparators being adjustable, in the means for delaying the output signal of the first comparator being a shift register and in the clock pulses supplied to the shift register being produced by a variable frequency oscillator so as to allow adjustment of the delay time by adjusting the oscillator frequency.

DETAILED DESCRIPTION OF THE PREFERRED EMBODIMENT

Figure 1:
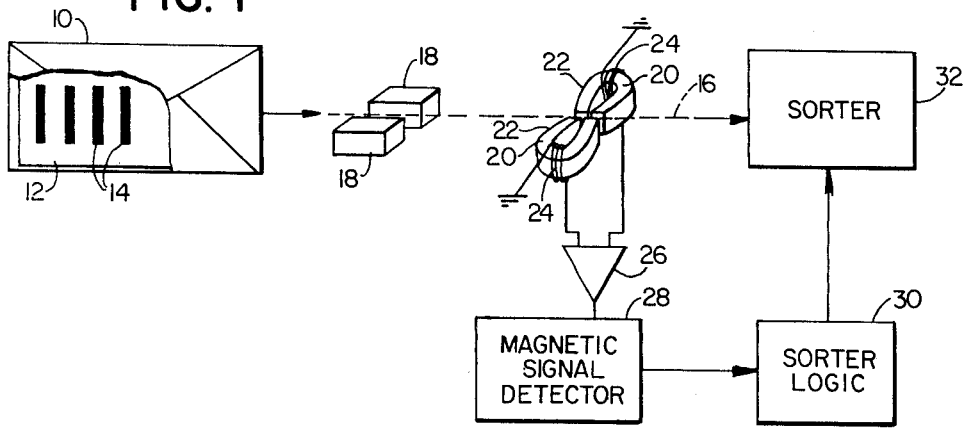
FIG. 1 is a schematic diagram illustrating an envelope sorting system utilizing a magnetic signal detector embodying the present invention.

An envelope sorting system using a magnetic signal detector embodying the present invention, is shown in FIG. 1. Referring to this figure, the system sorts envelopes, such as the one indicated at 10, each containing a coded insert 12. The insert 12 is similar to that described more completely in U.S. Pat. No. 3,895,220, and contains a number of spaced parallel lines or bars 14, 14 printed onto the insert 12 with magnetic ink. The insert 12 serves as a carrier for the bars 14, 14, with the bars, in accordance with a predetermined code, providing information assigning the associated envelope to a given one of a number of possible classes. Although the coding scheme may vary, the scheme of the illustrated system may be taken to be a simple one wherein the number of bars 14, 14 on an insert 12 determines the classification of the associated envelope 10—that is, an insert with one bar assigns the associated envelope to one class, an insert with two bars assigns the associated envelope to a second class, an insert with three bars assigns the associated envelope to a third class, and so on, with the sorting system serving to count the number of bars on the insert of each envelope and to sort the envelopes in accordance with such counts.

Still referring to FIG. 1, in the illustrated sorting system, envelopes such as that indicated at 10, are moved by conventional means along a transport path 16, preferably at a relatively high speed, for example at a rate of about 500 envelopes per minute or a speed of about 120 inches per second. The envelopes each first pass two permanent magnets 18, 18, one on each side of the transport path 16, which magnetize the bars 14, 14 of magnetic ink on the insert 12. Each envelope is then immediately moved past two magnetic pickups 20, 20 located on opposite sides of the path 16. Each pickup 20 is comprised of a core of magnetic material 22 and a winding 24 so that as each magnetized bar 14 passes each pickup it induces a characteristic voltage waveform pattern or signature in the associated winding 24. The two pickups 22, 22 are located at the same point along the transport path 16 so that each magnetized bar 14 simultaneously passes the two pickups and induces in-phase voltage waveforms in the two windings 24, 24.

The output voltage waveforms of the two pickup windings 24, 24 are summed by a summing amplifier 26 and the output of this amplifier is in turn transmitted to a magnetic signal detector 28. The reason for the two pickups 22, 22, as opposed to only one, involves the fact that the position of an insert 12 in an envelope 10 may vary depending on where it is placed relative to other documents also contained in the envelope. Thus, with regard to either one of the two pickups, as an envelope is moved past it the insert 12 may have a spacing relative to the pickup which varies from envelope to envelope depending on the number of intervening documents between the pickup and the insert, thereby causing the strength of the voltage waveform induced in the pickup winding to vary in accordance with such spacing. The use of two pickups, one on either side of the transport path, tends to avoid this problem and supplies to the magnetic signal detector 28 a voltage waveform the amplitude of which is not dependent on the position of the insert in the envelope.

The magnetic signal detector 28 of FIG. 1 monitors the pickup signal provided by the summing amplifier 26, detects features in such waveform representing passages of bars 14, 14 past the pickups and provides output signals representing such detections to a sorter logic 30. This logic in turn controls a sorter mechanism 32 which diverts the envelopes delivered to it to a number of pockets or other destinations in accordance with the codes of their inserts 12.

Figure 2:
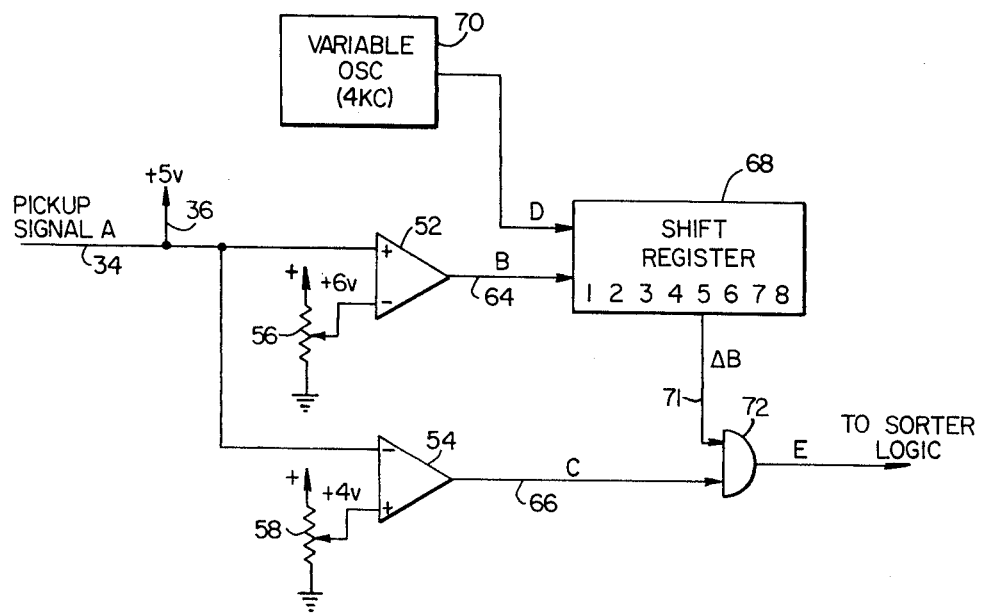
FIG. 2 is a schematic diagram of the magnetic signal detector if FIG. 1.

The present invention resides primarily in the construction of the magnetic signal detector 28 of FIG. 1, which is shown in more detail in FIG. 2. As seen in FIG. 2, the pickup signal, referred to as signal A, is supplied to the detector on input line 34. In the illustrated case of FIG. 1 this pickup signal is the combined output of the two pickups 22, 22 as supplied by the summing amplifier 26, but in other systems the pickup signal of FIG. 2 could be the output of a single pickup. As each bar of magnetized material passes the pickups 22, 22, the voltage waveform induced in the pickups undergoes a first main pulse of one polarity followed immediately by another main pulse of the opposite polarity. To keep the pickup signal A constantly within a range of positive voltages the input line 34 is connected to a line 36 supplying a biasing voltage of +5 volts which establishes +5 volts as the base voltage about which the pickup signal fluctuates.

Figure 3:
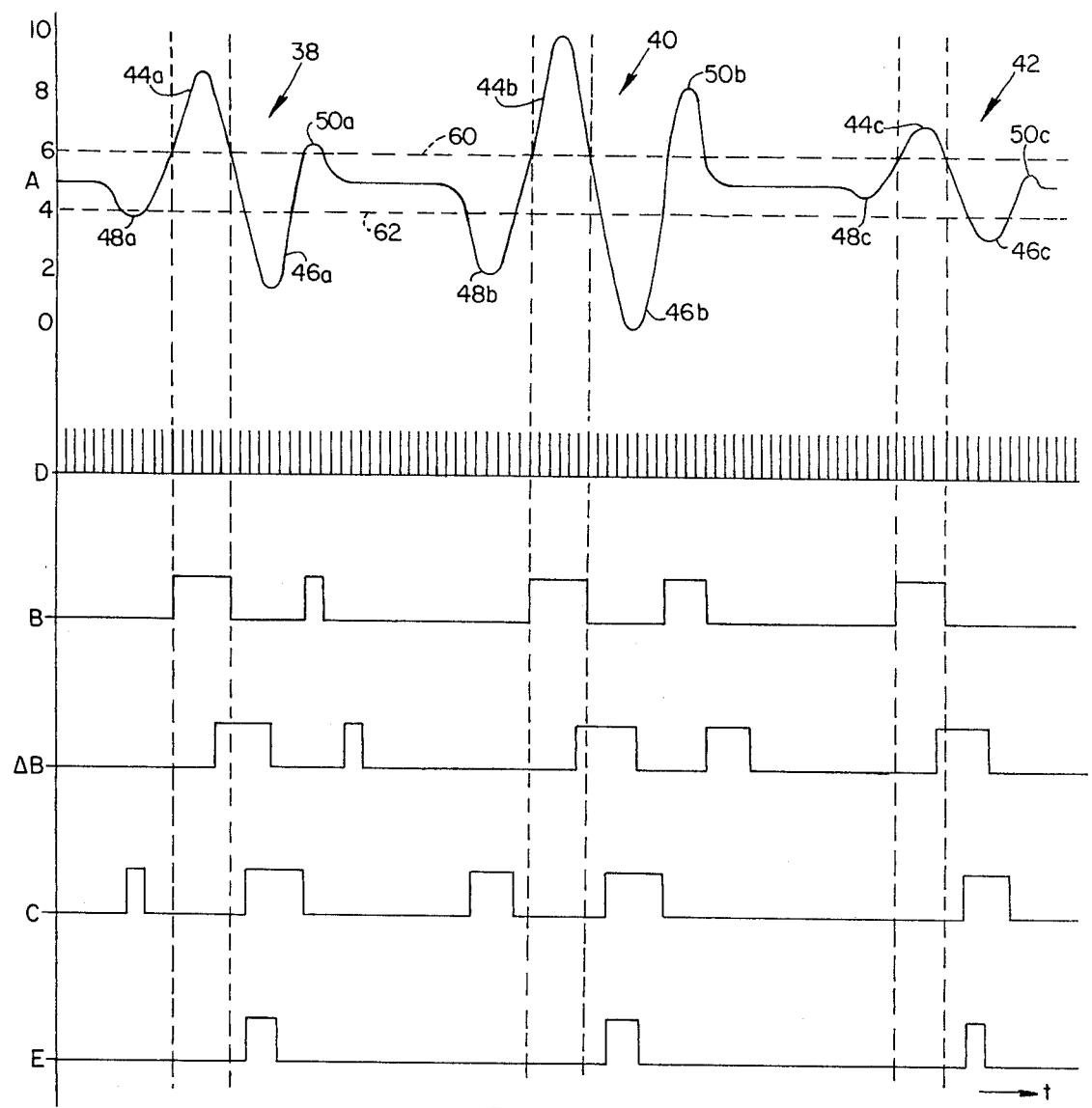
FIG. 3 is a diagram illustrating the output voltage waveform supplied to the magnetic signal detector of FIGS. 1 and 2 by the passage past the pickup of three bars of magnetized ink of different relative strengths, and also illustrating other related signals appearing at various points in the circuit.

Before continuing with the discussion of FIG. 2, reference is made to the upper portion of FIG. 3 which shows the pickup signal A as generated by the passage of three bars 14, 14 of different magnetic strength past the pickups 22, 22. In particular, the portion of the waveform indicated generally at 38 is a voltage pattern such as produced by a bar of average laydown of magnetic ink. The portion indicated generally at 40 is a voltage pattern such as produced by a bar 14 of relatively heavy laydown of magnetic ink, and the portion indicated generally at 22 is a voltage pattern such as generated by a bar 14 of relatively weak laydown of ink. Because of the +5 volt bias, the input signal A has a base voltage of +5 volts and the pickup signal is superimposed on the +5 volt base level to cause the input signal to depart to one side or the other of such base voltage.

Each of the three waveform patterns 38, 40 and 42 include a main pulse 44a, 44b or 44c of one polarity followed immediately by a second main pulse 46a, 46b or 46c of opposite polarity. In the illustrated case the first pulse 44a, 44b or 44c is of positive polarity (departs in the positive direction from the base voltage) and the second main pulse 46a, 46b or 46c is of negative polarity (departs in the negative direction from the base voltage) but this is not essential to the invention and the polarities of the pulses could be reversed if desired. Each waveform pattern 38, 40 and 42 also characteristicly includes a negative going initial pulse 48a, 48b or 48c, and a positive going pulse terminal or overshoot 50a, 50b or 50c. Previously, detection of the passage of bars or magnetic material past a pickup has often been attempted by looking for one or the other of the main pulses 44 or 46 of each bar induced voltage pattern of the input signal A. However, in some instances, the initial and terminal pulses 48 and 50 of the voltage pattern may take on significant amplitude, as for example in the illustrated pattern 40 produced by a bar of relatively heavy ink laydown, and cause the prior art detectors to incorrectly read such initial or terminal pulse as an extra bar of magnetic material.

The magnetic signal detector 28 of this invention avoids incorrect detection by producing an output signal indicating the valid detection of a bar of magnetic material only when a pulse having the polarity of the first main pulse of a bar induced voltage pattern is immediately followed by a pulse of the opposite polarity. Therefore, no initial pulse such as the pulse 48a, 48b or 48c will produce an output signal from the signal detector since such initial pulses are of the wrong polarity, and no terminal pulse such as the pulse 50a, 50b or 50c can cause an output signal from the detector since such terminal pulse is not immediately followed by another pulse of opposite polarity.

Referring again to FIG. 2, the magnetic signal detector 28 includes two comparing amplifiers 52 and 54 for comparing the pickup signal A with two different set point voltages. The amplifier 52 has its positive input terminal connected to the input line 34 and its negative input terminal connected to a set point voltage supplied by a manually adjustable potentiometer 56. The set point voltage for the amplifier 52 is greater than the base voltage and by way of example is shown to be +6 volts. On the other hand, the amplifier 54 has its negative input terminal connected to the input line 36 and its positive input terminal connected to a set point voltage supplied by another manually adjustable potentiometer 58. This second set point voltage is less than the base voltage and, for example, is illustrated to be +4 volts.

In FIG. 3, the two set point voltages for the comparators 52 and 54 are illustrated by the broken lines 60 and 62, respectively, the first set point voltage being one volt above the base voltage and the second set point voltage being one volt below the base voltage. When the input voltage signal A on the line 34 exceeds the +6 volt set point voltage of the comparator 52 the comparator provides an output signal B on the line 64, and when the input signal A falls below the +4 volt set point voltage of the comparator 54 the comparator 54 provides an output signal C on line 66.

The signal B from the comparator 52 is delayed in time and the delayed signal ΔB so obtained is time compared with the output signal C from the comparator 54 to produce a bar indicating signal E when the latter two signals occur simultaneously. As shown in FIG. 2, the means for delaying the signal B from the comparator 52 comprises a serial shift register 68 having a clock terminal, a data input terminal and eight parallel output terminals. The line 64 carrying the signal B from the comparing amplifier 52 is connected to the shift register's data input terminal. A variable oscillator 70 which produces clock pulses (the signal D) at a manually adjustable repetition rate is connected to the shift register's clock terminal. In the illustrated case the shift register 58 is shown to be an eight bit register and the delayed signal ΔB is shown to be taken from the fifth bit output terminal by the line 71. Accordingly, it will be understood that when a signal B appears on the line 64 a delayed representation ΔB of such signal will appear on the line 71 at a delayed period related to the frequency or repetition rate of the oscillator 70, such delay period being selected as to cause the delayed signal produced by the first main pulse of a bar induced voltage pattern to overlap with the signal C produced by the second main pulse of such voltage pattern. Such overlapping is detected by the AND gate 72 to which both the ΔB and C signals are supplied as inputs. That is, when a ΔB signal exists simultaneously with a C signal the AND gate 72 produces an output signal E which is transmitted to the sorter logic 30 as a signal indicating the valid detection of a bar of magnetic material.

Having now described the circuit of FIG. 2, its operation may be further understood by reference to FIG. 3 which in addition to the pickup waveform patterns 38, 40 and 42 also shows the corresponding signals D, B, ΔB, C and E produced in response to such waveform patterns. From this figure, it will be noted that an output signal E is produced only during the time that a signal ΔB exists simultaneously with a signal C and that this situation only occurs when the ΔB signal in question is produced by the first main voltage pulse of a bar induced voltage pattern and the signal C is produced by the second main voltage pulse of the voltage pattern. At times when the initial pulses, such as the illustrated pulses 48a and 48b fall below the +4 volt set point voltage they produce associated C signals, but these C signals do not overlap with any ΔB signals and therefore produce no erroneous E signals. Likewise, at times when the terminal pulses, such as the pulses 50a and 50b of the voltage patterns, exceed the +6 volt set point they produce corresponding B and ΔB signals, but such ΔB signals do not overlap any C signals and, therefore, likewise also fail to produce any erroneous E signal.

We claim:

1. A circuit for detecting signals from a voltage waveform generated by a pickup for sensing bars of magnetized material appearing on a carrier moved past the pickup and which voltage waveform for each bar moved past the pickup has a base voltage level and includes a first voltage pulse of one polarity relative to said base voltage followed by a second voltage pulse of opposite polarity relative to said base voltage, said circuit having said pickup voltage waveform as an input thereto and comprising a means for producing an output signal indicating the valid detection of a bar of magnetic material only when said voltage waveform undegoes a pulse of said one polarity having an amplitude greater than a first predetermined value and is immediately followed by a pulse of said opposite polarity having an amplitude greater than a second predetermined value.

2. A circuit as defined in claim 1 further characterized by said first predetermined value of amplitude and said second predetermined value of amplitude being equal to one another.

3. A circuit as defined in claim 1 further characterized by said means for producing an output signal including a means for producing a first signal which persists for so long as said pulse of one polarity exceeds said first predetermined value of amplitude, a means for producing a second signal which persists for so long as said pulse of opposite polarity exceeds said second predetermined value of amplitude, a means responsive to said first signal for producing a third signal which is a delayed representation of said first signal, and means for producing an output signal when said second and third signals overlap one another in time.

4. A circuit as defined in claim 1 further characterized by said means for producing an output signal including a first comparator for comparing the voltage waveform of said pickup with a first predetermined set point voltage of said one polarity and for producing a signal B which persists for so long as said voltage waveform is of said one polarity and exceeds said first predetermined set point voltage, a second comparator for comparing said voltage waveform with a second predetermined set point voltage of said opposite polarity and for producing a signal C which persists for so long as said voltage waveform is of said opposite polarity and exceeds said second set point voltage, means for delaying in time the output signal B of said first comparator to produce a delayed signal ΔB, and means for producing a signal indicating the valid detection of a bar of magnetic material when said delayed signal ΔB exists simultaneously with the signal C from said second comparator.

5. A circuit as defined in claim 4 further characterized by a manually adjustable means for providing and adjusting said first predetermined set point voltage, and a second manually adjustable means for providing and adjusting said second predetermined set point voltage.

6. A circuit as defined in claim 4 further characterized by said means for delaying in time the output of said signal B of said first comparator comprising a serial shift register having a data input terminal, a clock terminal and a plurality of parallel output terminals, means transmitting said output signal B of said first comparator to said data input terminal, and means supplying clock pulses to said clock terminal, said means for producing a signal indicating the valid detection of a bar of magnetic material comprising an AND gate having one input terminal connected to the output of said second comparator and another input terminal connected to one of said parallel output terminals of said shift register.

7. A circuit as defined in claim 6 further characterized by said means supplying clock pulses to said clock terminal comprising an oscillator which is manually adjustable to vary the repetition rate of the clock pulses produced thereby.

8. A circuit for detecting signals from a voltage waveform generated by a pickup for sensing bars of magnetized material appearing on a carrier moved past the pickup and which voltage waveform for each bar moved past the pickup has a base voltage level and includes a first voltage pulse departing in one direction from said base voltage followed by a second voltage pulse departing in the opposite direction from said base voltage, said circuit comprising a first comparator for comparing a voltage waveform with a first predetermined set point voltage offset in said one direction from said base voltage and for producing a voltage signal B which persists for as long as the voltage of said waveform as measured in said one direction from said base voltage exceeds said first set point voltage, a second comparator for comparing said voltage waveform with a second predetermined set point voltage offset in said opposite direction from said base voltage and for producing a voltage signal C which persists for as long as the voltage of said waveform as measured in said opposite direction from said base voltage exceeds said second set point, a means for delaying said signal B to produce a delayed signal $\Delta B$ of a duration substantially similar to that of said signal B but occurring later in time than said signal B, and an AND gate having as inputs said delayed signal $\Delta B$ and said signal C and producing an output signal indicating the valid detection of a bar of magnetic material during the time said delayed signal $\Delta B$ and said signal C exist simultaneously.

9. A circuit as defined in claim 8 further characterized by a first manually adjustable potentiometer for providing said first predetermined set point voltage, and a second manually adjustable potentiometer for providing said second predetermined set point voltage.

10. A circuit as defined in claim 8 further characterized by said means for delaying said signal B to produce a delayed signal B comprising a serial shift register having a data input terminal, a clock terminal and a plurality of parallel output terminals, means transmitting said output signal B of said first comparator to said input terminal, and means supplying clock pulses to said clock terminal, said delayed signal $\Delta B$ being derived from one of said output terminals of said shift register.

* * * * *

UNITED STATES PATENT AND TRADEMARK OFFICE
CERTIFICATE OF CORRECTION

PATENT NO. : 4,218,612
DATED : August 19, 1980
INVENTOR(S) : William H. Krehl, John R. DeHart It is certified that error appears in the above-identified patent and that said Letters Patent are hereby corrected as shown below:

Column 6, line 10, "undegoes" should be --undergoes--.
Column 8, line 17, "signal B" should be --signal $\Delta B$--.

Signed and Sealed this

Eighteenth Day of November 1980

[SEAL]

Attest:

SIDNEY A. DIAMOND

Attesting Officer

Commissioner of Patents and Trademarks